United States Patent
Byers

(10) Patent No.: US 10,153,718 B2
(45) Date of Patent: Dec. 11, 2018

(54) STEPPER MOTOR DRIVE AND STALL DETECTION CIRCUIT

(71) Applicant: STMicroelectronics, Inc., Coppell, TX (US)

(72) Inventor: Ian Byers, Northville, MI (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 15/435,912

(22) Filed: Feb. 17, 2017

(65) Prior Publication Data

US 2018/0241330 A1 Aug. 23, 2018

(51) Int. Cl.
*H02P 8/34* (2006.01)
*H02P 8/08* (2006.01)
*H02P 23/00* (2016.01)

(52) U.S. Cl.
CPC ........... *H02P 8/08* (2013.01); *H02P 23/0077* (2013.01)

(58) Field of Classification Search
CPC ....................................................... H02P 8/00
See application file for complete search history.

(56) References Cited

U.S. PATENT DOCUMENTS

| | | | | |
|---|---|---|---|---|
| 3,639,824 A | * | 2/1972 | Malavasi | G05D 23/24 318/599 |
| 4,330,739 A | * | 5/1982 | Chiang | G01R 31/34 318/490 |
| 4,734,632 A | * | 3/1988 | Kamikura | H02P 8/14 318/685 |
| 4,792,816 A | * | 12/1988 | Kennedy, Jr. | B41B 21/36 318/685 |
| 5,847,535 A | * | 12/1998 | Nordquist | H02P 8/32 318/438 |
| 7,239,108 B2 | | 7/2007 | Best | |
| 7,705,555 B2 | | 4/2010 | Pinewski et al. | |

* cited by examiner

*Primary Examiner* — Bentsu Ro
(74) *Attorney, Agent, or Firm* — Crowe & Dunlevy

(57) ABSTRACT

A first differential amplifier output drives a first winding of a stepper motor and a second differential amplifier output drives a second winding of the stepper motor. Inputs of the first and second differential amplifiers receive input drive signals generated by either a digital to analog converter or a pulse width modulator, where the input drive signals are phase offset sinusoids. Current flowing through a stepper motor winding is sensed to generate a current sense signal. A stall sensing circuit processes the current sense signal to determine whether the stepper motor has stalled by: taking a first derivative of the current sense signal to generate a first derivative signal; taking a second derivative of the current sense signal to generate a second derivative signal; and processing one or more of the current sense signal, the first derivative signal and the second derivative signal to detect a stepper motor stall condition.

57 Claims, 5 Drawing Sheets

STEPPER MOTOR DRIVE AND STALL DETECTION CIRCUIT

TECHNICAL FIELD

The disclosure relates to stepper motor drive and sense circuitry and, in particular, to a circuit for driving the windings of a stepper motor and sensing winding current for detecting a stall condition.

BACKGROUND

A stepper motor is a type of motor that operates by incrementally stepping through various rotational positions. A typical stepper motor includes two windings and a rotor. The windings are oriented perpendicular to each other and alternatively driven by drive circuitry so as to cause rotational movement of the rotor. When driven in full-step mode, there are four step states (0°, 90°, 180° and 270°) corresponding to the electrical angle of the motor. Each full step of the motor involves full activation of the coils to one of these four states, with each state advancing the motor one quarter of the full electrical cycle. The correlation of the electrical cycle to mechanical degree will vary with winding construction, rotor construction, gearing, etc. To improve step resolution, it is known in the art to drive the stepper motor in micro-step mode where both windings of the stepper motor are simultaneously and continuously driven with stepped voltages that are out of phase with each other.

A typical drive architecture for a stepper motor uses an H-bridge drive circuit (with four MOSFETs) coupled to each motor winding. Provision of such H-bridge drivers is easy, but comes at an added expense and complexity of timer modules necessary to drive such circuitry. Indeed, application specific motor driver circuits including plural H-bridge drivers are typically used.

It is important in most applications of stepper motors to define a reference point for the initial starting position of the motor. A common solution for the defined reference point is the provision of an internal or external mechanical hard stop. The stepper motor is driven in a direction to return towards the mechanical hard stop and a sensing technique is implemented to detect a stall of the stepper motor against the mechanical hard stop. A common stall sensing technique senses voltage (for example, back EMF voltage) on a non-driven one of the two windings. This sensing operation can, however, be challenging due to small signal levels, blanking periods and motor noise. It is also known in the art to use a current sensing operation for stall detection.

SUMMARY

In an embodiment, a circuit for driving a first winding and a second winding of a stepper motor comprises: a first differential amplifier circuit having a first input, a second input and an output, said output of the first differential amplifier circuit configured to be coupled to a first terminal of the first winding of the stepper motor; a second differential amplifier circuit having a first input, a second input and an output, said output of the second differential amplifier circuit configured to be coupled to a first terminal of the second winding of the stepper motor; and a digital to analog converter circuit configured to generate a first input drive signal coupled to the first input of the first differential amplifier circuit and generate a second input drive signal coupled to the first input of the second differential amplifier circuit.

In an embodiment, a circuit for driving a first winding and a second winding of a stepper motor comprises: a first differential amplifier circuit having a first input, a second input and an output, said output of the first differential amplifier circuit configured to be coupled to a first terminal of the first winding of the stepper motor, and including a capacitor coupled to form a feedback path from the output of the first differential amplifier circuit to the first input of the first differential amplifier circuit; a second differential amplifier circuit having a first input, a second input and an output, said output of the second differential amplifier circuit configured to be coupled to a first terminal of the second winding of the stepper motor, and including a capacitor coupled to form a feedback path from the output of the second differential amplifier circuit to the first input of the second differential amplifier circuit; and a pulse width modulation circuit configured to generate a first input drive signal coupled to the first input of the first differential amplifier circuit and generate a second input drive signal coupled to the first input of the second differential amplifier circuit.

In an embodiment, a circuit comprises: a current sensing circuit configured to sense current flowing through a winding of a stepper motor and output a current sense signal; and a stall sensing circuit configured to receive the current sense signal and determine whether the stepper motor has stalled by: taking a first (or higher order) derivative of the current sense signal to generate a derivative signal; and processing the current sense signal and the derivative signal to detect a stepper motor stall condition.

BRIEF DESCRIPTION OF THE DRAWINGS

For a better understanding of the embodiments, reference will now be made by way of example only to the accompanying figures in which.

DETAILED DESCRIPTION

Figure 1:
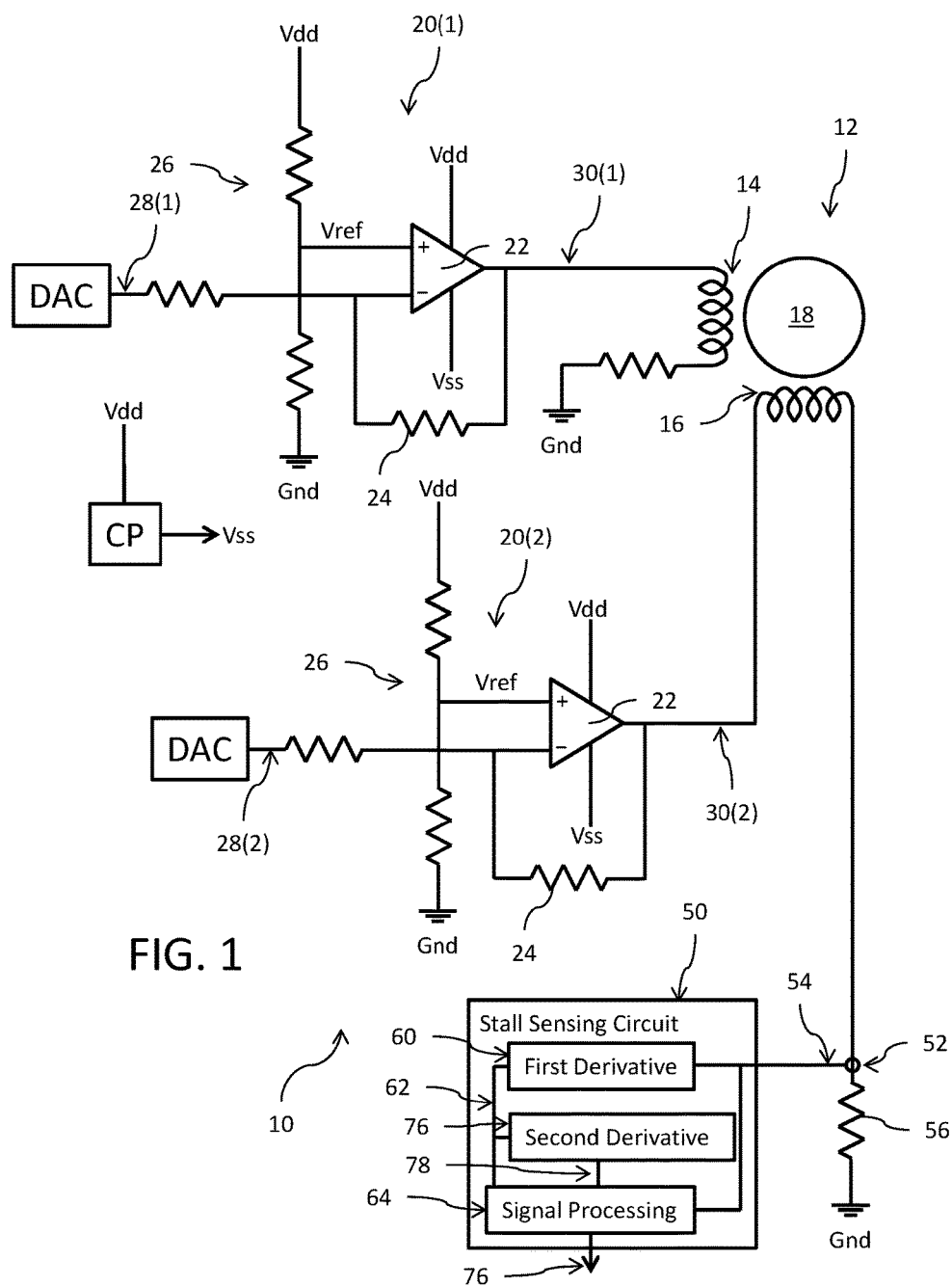
FIG. 1 is a circuit diagram for a stepper motor drive and sense circuit.

Reference is now made to FIG. 1 showing a circuit diagram for a stepper motor drive and sense circuit 10. The circuit 10 is configured to be coupled to a stepper motor 12 including a first winding 14, a second winding 16 and a rotor 18.

The circuit 10 includes a driver circuit 20 for each winding that is not based on an H-bridge architecture as is typical in the prior art. The driver circuit 20 includes an operational amplifier 22 having an output coupled to a first terminal of one of the first or second windings 14 or 16, wherein the second terminal of that winding is coupled to ground (Gnd) through a sense resistor. The operational amplifier 22 is powered from a positive power supply node Vdd (where Vdd>Gnd) and a negative power supply node Vss (where Vss<Gnd). The operational amplifier 22 further includes a non-inverting input ("+") coupled to receive a reference voltage Vref. The reference voltage Vref is generated by a resistive voltage divider 26 coupled, for example, between the positive power supply node Vdd and ground Gnd. An inverting input ("−") of the operational amplifier 22 is coupled to receive an input drive signal 28 having a voltage that varies between a positive maximum voltage value (at Vdd) and ground (at Gnd). A feedback resistor 24 is coupled between the output of the operational amplifier 22 and the inverting input of the operational amplifier 22 to set amplification gain. The operational amplifier 22 is accordingly configured to function as an inverting amplifier with offset that effectively amplifies and level shifts the input drive signal 28 to generate an output drive signal 30 having a voltage that varies between a positive maximum voltage value (at Vdd) and a negative maximum voltage value (at Vss). In this circuit configuration, the voltage of the output drive signal 30 is equal to an amplified version of the input signal with offset controlled by Vref.

The driver circuit 20(1) coupled to the first terminal of the first winding 14 receives a first phase of the input drive signal 28(1) and generates a corresponding first phase of the output drive signal 30(1). The driver circuit 20(2) coupled to the first terminal of the second winding 16 receives a second phase of the input drive signal 28(2) and generates a corresponding second phase of the output drive signal 30(2). The input drive signals 28(1) and 28(2), and thus also the output drive signals 30(1) and 30(2), may, for example, have sinusoidal shapes or square wave shapes depending on drive application and step functionality. The first and second phases of the signals may, for example, be offset by 90°. The input drive signals 28(1) and 28(2) may, for example, each be generated by a digital to analog converter (DAC) circuit. The negative voltage at the negative power supply node Vss may, for example, be generated by a negative voltage charge pump (CP).

The circuit 10 further includes a stall sensing circuit 50 comprised of a current sensing circuit 52 coupled to at least one of the first or second windings 14 or 16. The current sensing circuit 52 operates to sense current flow through the winding and generate a current sense signal 54 indicative of that sensed current flow. As an example, the current sensing circuit 52 may utilize a resistor 56 coupled between the second terminal of the winding and ground as a sense resistance, with the voltage drop across that sense resistance being measured (for example, using a differential amplifier) to generate the current sense signal 54.

The stall sensing circuit 50 performs signal processing on the current sense signal 54 indicative of sensed current flow through the winding in order to detect a stall of the stepper motor against, for example, a mechanical hard stop. This signal processing can occur in either the analog domain or digital domain or in both the analog domain and digital domain. The following discussion of the signal processing operations performed by the stall sensing circuit 50 is presented in terms of functional operations. It will be understood that each functional operation could be performed in the analog domain, in the digital domain or in a mixed analog/digital domain solution. For operations performed in the digital domain, the stall sensing circuit 50 includes appropriate analog to digital converter (ADC) circuitry to convert analog signal information to digital signal information. Operations in the digital domain may be performed by a digital signal processing circuit, a computer executing software/firmware, or digital logic circuits. Operations in the analog domain may be performed by analog processing circuits such as integrators, differentiators, comparators, differential amplifiers, etc.

Figure 2A:
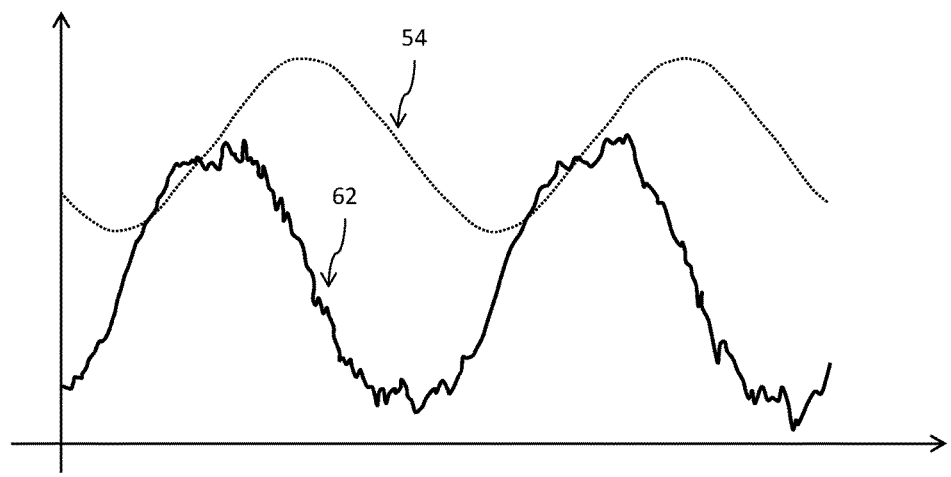
FIGS. 2A-2E are waveforms illustrating operation of the circuit of FIG. 1 and details of various stall detection techniques.
Figure 2B:
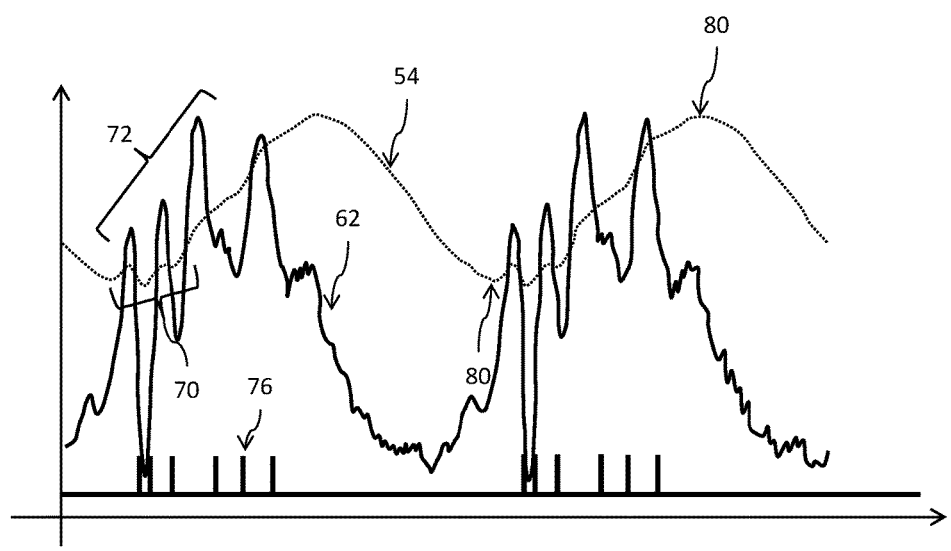

One function performed by the stall sensing circuit 50 is a differentiator function 60 that operates to take the first derivative of the current sense signal 54 and output a first derivative signal 62. The first derivative signal 62 accordingly indicates whether the sensed current in the winding is increasing or decreasing and further how much that sensed current is increasing or decreasing. FIG. 2A shows a graph of the current sense signal 54 in response to the micro-stepped phase offset drive signals 30(1)/30(2) during normal operation of the stepper motor, along with a graph of the first derivative signal 62. FIG. 2B shows a graph of the current sense signal 54 in response to micro-stepped phase offset drive signals 30(1)/30(2) when the stepper motor is stalled, along with a graph of the first derivative signal 62.

The stall sensing circuit 50 further includes a signal processing function 64 that receives the current sense signal 54 and the first derivative signal 62. The signal processing function 64 processes one or both of the current sense signal 54 and the first derivative signal 62 to make a determination that the stepper motor is stalled. With reference to FIG. 2B, showing graphs of the current sense signal 54 and the first derivative signal 62 during a stall event, the signal processing function 64 operates to recognize certain signal shapes that are indicative of the stall event. For example, there may exist small magnitude oscillations of the current sense signal 54 with a frequency greater than the frequency of the drive signals 30 (see, generally at reference 70) that are indicative of a stall. This analysis performed by the signal processing function 64 in essence compares the current sense signal 54 to a long term average of the sampled current in an effort to detect cross-over points occurring within a relatively short timespan compared to the period of the drive signal 30. Still further, there may exist large magnitude oscillations of the first derivative signal 62 with a frequency greater than the frequency of the drive signals 30 (see, generally at reference 72) that are indicative of a stall. This analysis performed by the signal processing function 64 in essence compares the first derivative signal 62 to a long term average of the first derivative signal 62 in an effort to detect cross-over points occurring within a relatively short timespan compared to the period of the drive signal 30.

FIG. 2B further shows the stall detect output signal 76 generated by the stall sensing circuit 50. Signal assertions of the stall detect output signal 76 are generally coincident with the oscillations of references 70 and 72.

Another function performed by the stall sensing circuit 50 is a differentiator function 76 that operates to take the second derivative of the current sense signal 54 (i.e., the derivative of the first derivative signal 62) and output a second derivative signal 78. The second derivative signal 78 accordingly indicates whether the first derivative signal 62 is increasing or decreasing and further how much that first derivative signal 62 is increasing or decreasing. The second derivative signal 78 further provides important information at critical points (reference 80) where the current sense signal 54 is at a local minimum or local maximum. This important information concerns the positive or negative orientation of the current sense signal 54.

Figure 2C:
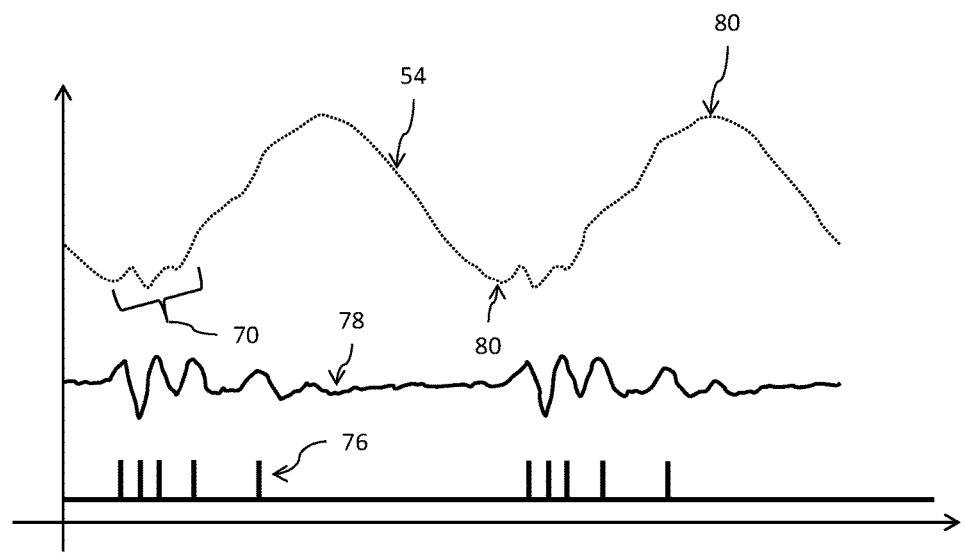

FIG. 2C shows a graph of the current sense signal 54 in response to phase offset drive signals 30(1)/30(2) when the stepper motor is stalled, along with and a graph of the second derivative signal 78. FIG. 2C further shows the stall detect output signal 76 generated by the stall sensing circuit 50. Signal assertions of the stall detect output signal 76 are generally coincident with instances where the magnitude of the second derivative signal 78 exceeds certain detection thresholds.

The signal processing function 64 of the stall sensing circuit 50 may employ, as needed, a scaling of one or more of the current sense signal 54, the first derivative signal 62 and the second derivative signal 78.

One analysis performed by the signal processing function 64 involves analyzing the absolute threshold of one or more of the current sense signal 54, the first derivative signal 62 and the second derivative signal 78. As an example, the second derivative of the current sense signal has minimal absolute value during normal operation. However, during a stall event, the maximum and minimum values are much larger, and can be compared against an absolute threshold for detection of the stall event. This is due to the rapid increase/decrease of the motor current when in close proximity of the hard stop. Other signal derivatives (i.e. first derivative) could be used in an absolute threshold comparison, but analysis indicates that the second derivative to be most reliable for this type of analysis. See, FIG. 2C.

Figure 2D:
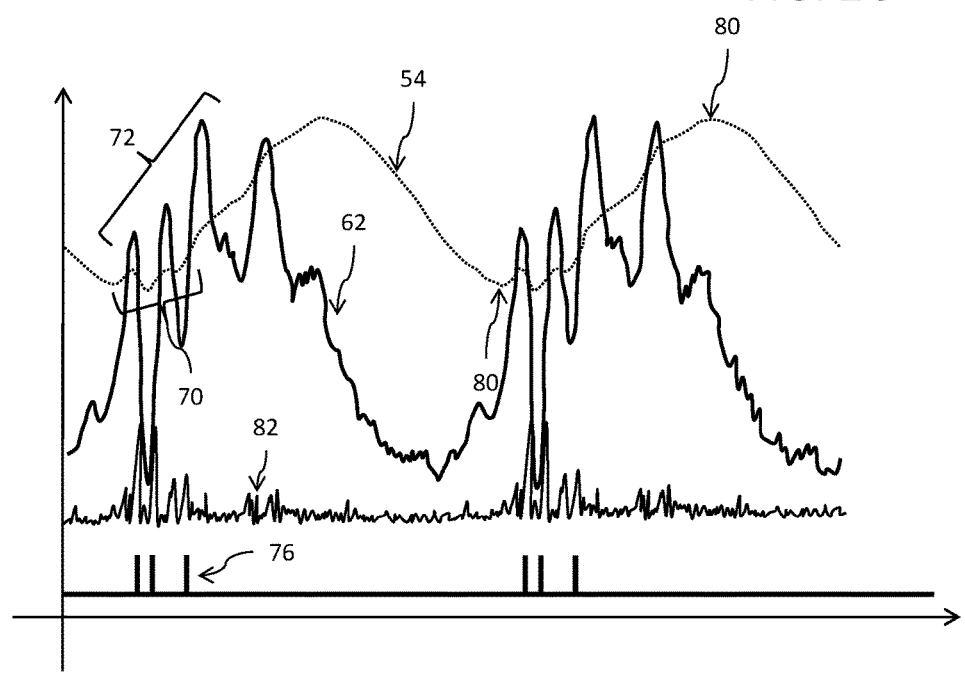

Another analysis performed by the signal processing function 64 involves analyzing signal amplitude (high-low) within a small time window of one or more of the current sense signal 54, the first derivative signal 62 and the second derivative signal 78. This method involves examining maximum and minimum values of a signal during a defined window, and looking at the difference between these two values (signal 82). It works by examining the overall volatility of the signal in question, and can be performed on any of the current sense signals (i.e., current sense signal, first derivative, second, derivative, etc.). FIG. 2D shows this type of analysis on the first derivative signal specifically. FIG. 2D further shows the stall detect output signal 76 generated by the stall sensing circuit 50.

Yet another analysis performed by the signal processing function 64 involves analyzing high frequency components within a small time window of one or more of the current sense signal 54, the first derivative signal 62 and the second derivative signal 78. During a stall event, the motor coil current will typically fluctuate rapidly with respect to the driven signal as it initially sees an increased load, followed by a decrease with further oscillations as the signal progresses. This rapid oscillation is detected by frequency analysis methods to determine the location of the mechanical stop. In this particular case, a Fast Fourier Transform of the first derivative signal is used to determine the stall detect. A comparison of the FFT plot after the stall event to the FFT plot prior to the stall event, for example, shows an increase of about 25-30 dB around 130 Hz which is indicative of the fluctuating current at a frequency higher than the drive frequency from which the stall event can be detected.

Figure 2E:
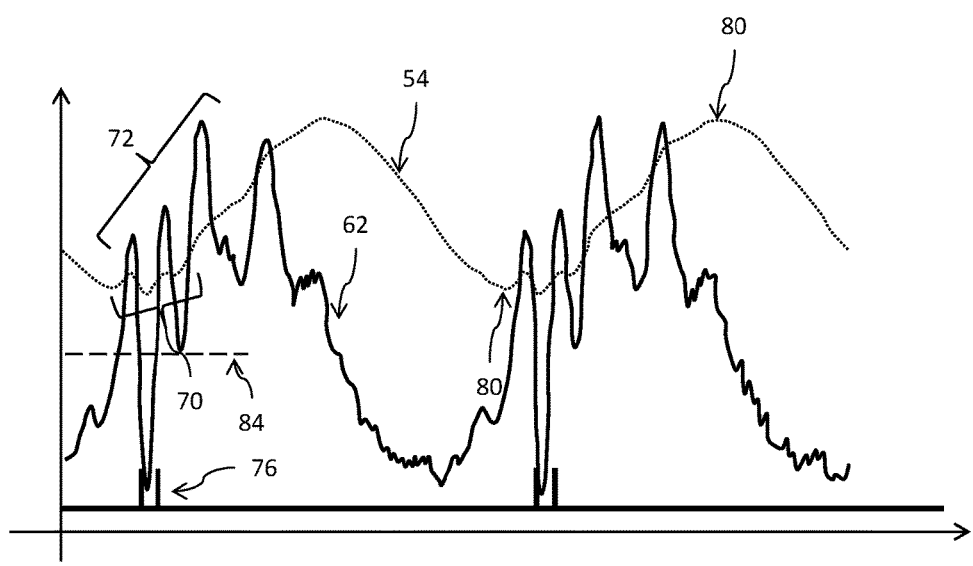

Still further, another analysis performed by the signal processing function 64 involves analyzing zero-crossing in a short timespan of one or more of the current sense signal 54, the first derivative signal 62 and the second derivative signal 78. This is another method that examines the volatility and higher frequency oscillations of the current during a stall event. In this analysis, the number of "zero crossings" (signal going from positive to negative or vice versa of a zero cross line 84) during a window is examined. During normal operation (no stall), the zero crossing is predictable and will match the drive frequency. Since the motor coil current will see a sharp increase followed by a decrease when micro-stepping against a hard stop, the derivative of the sensed signal will change sign, or zero-cross, multiple times during a short time period during this event. This can be easily distinguished from the predictable zero crossings during normal operation. See, FIG. 2E.

Another analysis performed by the signal processing function 64 involves comparing analyzing one or more of the current sense signal 54, the first derivative signal 62 and the second derivative signal 78 to a longer term average of that signal to detect crossover points within a short time span. This method is very similar to the previous method, however we distinguish this method by the threshold to which the signal is compared. Previously, the "zero" crossing was examined, or comparison with a zero value signal. It is noted that with some motors and some hard stops, the change in the current sense signal may not be abrupt enough to completely change sign, or zero-cross. Due to this, we can utilize a method of detecting when the signal (i.e., the first derivative of the sensed current) crosses over a long term average of itself. This will serve the same purpose of detecting the volatility and oscillation of the signal when the change is not so abrupt. See, FIG. 2B.

Figure 3:
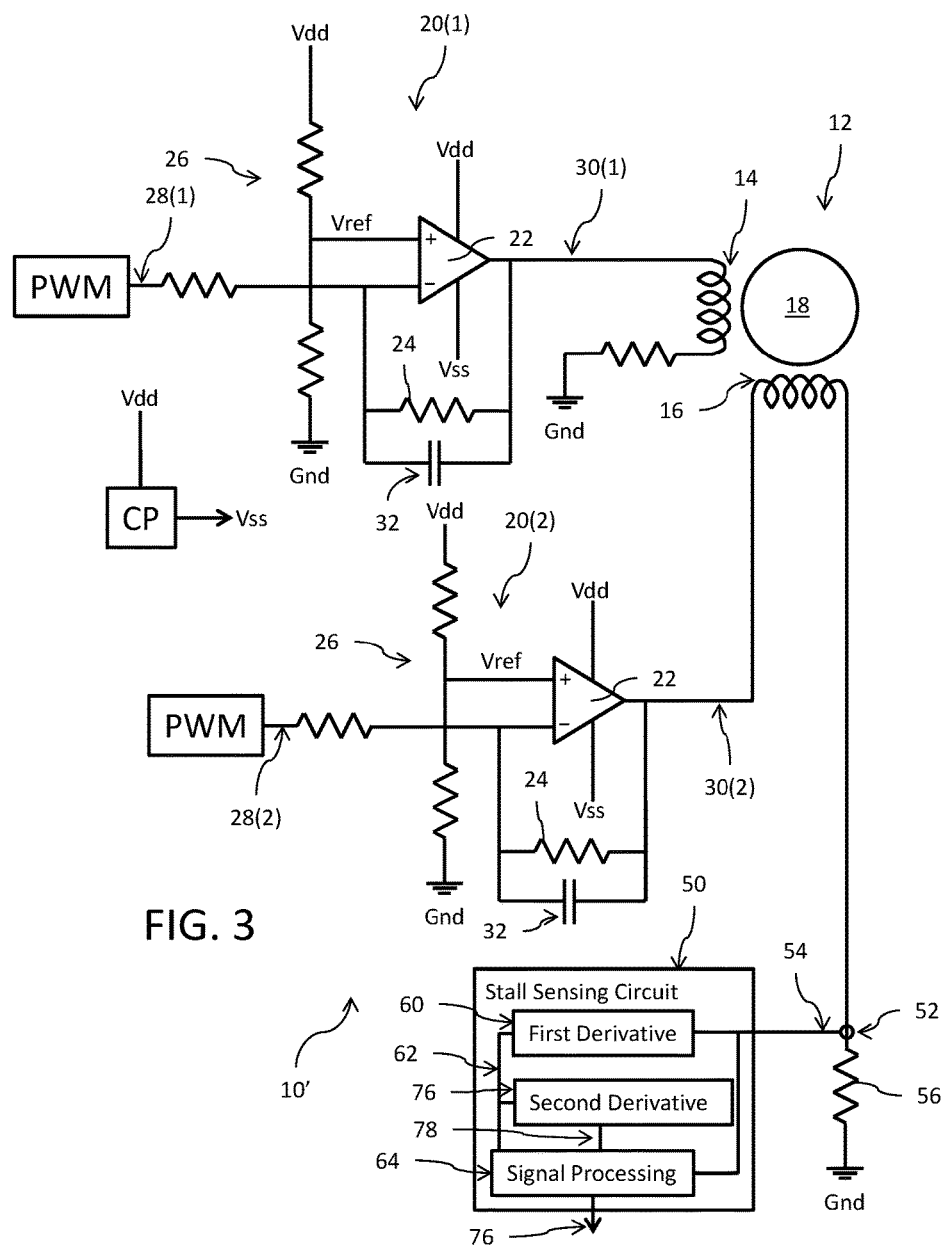
FIG. 3 is a circuit diagram for a stepper motor drive and sense circuit.

Reference is now made to FIG. 3 showing a circuit diagram for a stepper motor drive and sense circuit 10'. Like reference numbers in FIG. 3 refer to like or similar components in FIG. 1. The description of such components is incorporated by reference. The circuit 10' differs from the circuit 10 in that each driver circuit 20 further includes a capacitor 32 coupled in parallel with the feedback resistor 24 between the output of the operational amplifier 22 and the inverting input of the operational amplifier 22. This capacitor serves the purpose of adding a first order filter prior to the output signal. Other filtering methods and higher order filtering could be used. The circuit 10' further differs from the circuit 10 in that the source of the input drive signals 28(1) and 28(2) is instead a pulse width modulation (PWM) circuit. The width of the pulses output from the PWM circuit varies over time as a function, for example, of a sinusoid.

The circuit 10' implements the same stall detection processing operations as the circuit 10.

The stall sensing circuit 50 may, for example, be implemented using any suitable microprocessor or microcontroller circuit. In an example implementation, the stall sensing circuit 50 operations are supported by an Accordo System on Chip (SoC) type processor from ST Microelectronics. In this implementation, the stepper motors would be associated with an automobile instrument cluster (gauges, etc.) and the Accordo processor would be fully capable to drive the stepper motors in this fashion and handle high end 3D graphics functions associated with automotive clusters or integrated with automotive infotainment systems in an integrated cockpit environment.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A circuit for driving a first winding and a second winding of a stepper motor, comprising:
    a first differential amplifier circuit having a first input, a second input and an output, said output of the first differential amplifier circuit configured to be coupled to a first terminal of the first winding of the stepper motor;
    a second differential amplifier circuit having a first input, a second input and an output, said output of the second differential amplifier circuit configured to be coupled to a first terminal of the second winding of the stepper motor;
    a digital to analog converter circuit configured to generate a first input drive signal coupled to the first input of the first differential amplifier circuit and generate a second input drive signal coupled to the first input of the second differential amplifier circuit; and a stall sensing circuit configured to receive the current sense signal and determine whether the stepper motor has stalled by:

taking a first derivative of the current sense signal to generate a first derivative signal; and processing the current sense signal and the first derivative signal to detect a stepper motor stall condition.

2. The circuit of claim 1, wherein the first and second input drive signals have one of a sinusoidal shape or square wave shape that are offset from each other in phase.

3. The circuit of claim 2, wherein a second terminal of each of the first and second windings of the stepper motor is coupled to ground through a resistor.

4. The circuit of claim 1, wherein each of the first and second differential amplifier circuits includes a circuit configured to generate a reference voltage for application to the second input.

5. The circuit of claim 4, wherein each of the first and second differential amplifier circuits further includes a feedback resistor coupled to form a feedback path from the output to the first input.

6. The circuit of claim 5, wherein each of the first and second differential amplifier circuits has a first power supply input coupled to receive a positive supply voltage and a second power supply input coupled to receive a negative supply voltage.

7. The circuit of claim 1, wherein the stall sensing circuit is further configured to determine whether the stepper motor has stalled by:

taking a second derivative of the current sense signal to generate a second derivative signal; and processing the current sense signal, the first derivative signal and the second derivative signal to detect a stepper motor stall condition.

8. The circuit of claim 1, wherein the stall sensing circuit comprises a sense resistor coupled between ground and a second terminal of one of the first and second windings of the stepper motor.

9. A circuit for driving a first winding and a second winding of a stepper motor, comprising:

a first differential amplifier circuit having a first input, a second input and an output, said output of the first differential amplifier circuit configured to be coupled to a first terminal of the first winding of the stepper motor, and including a capacitor coupled to form a feedback path from the output of the first differential amplifier circuit to the first input of the first differential amplifier circuit;

a second differential amplifier circuit having a first input, a second input and an output, said output of the second differential amplifier circuit configured to be coupled to a first terminal of the second winding of the stepper motor, and including a capacitor coupled to form a feedback path from the output of the second differential amplifier circuit to the first input of the second differential amplifier circuit; and a pulse width modulation circuit configured to generate a first input drive signal coupled to the first input of the first differential amplifier circuit and generate a second input drive signal coupled to the first input of the second differential amplifier circuit.

10. The circuit of claim 9, wherein the capacitors in the feedback paths of the first and second differential amplifier circuits provide first order filtering of the first and second input drive signals from the pulse width modulation circuit.

11. The circuit of claim 9, wherein pulse widths of the first and second input drive signals sinusoidally vary over time offset in phase.

12. The circuit of claim 11, wherein a second terminal of each of the first and second windings of the stepper motor is coupled to ground through a resistor.

13. The circuit of claim 9, wherein each of the first and second differential amplifier circuits includes a circuit configured to generate a reference voltage for application to the second input.

14. The circuit of claim 13, wherein each of the first and second differential amplifier circuits further includes a feedback resistor coupled in parallel with the capacitor.

15. The circuit of claim 14, wherein each of the first and second differential amplifier circuits has a first power supply input coupled to receive a positive supply voltage and a second power supply input coupled to receive a negative supply voltage.

16. The circuit of claim 9, further comprising:

a current sensing circuit configured to sense current flowing through the first winding of the stepper motor and output a current sense signal; and a stall sensing circuit configured to receive the current sense signal and determine whether the stepper motor has stalled by:

taking a first derivative of the current sense signal to generate a first derivative signal; and processing the current sense signal and the first derivative signal to detect a stepper motor stall condition.

17. The circuit of claim 16, wherein the stall sensing circuit is further configured to determine whether the stepper motor has stalled by:

taking a second derivative of the current sense signal to generate a second derivative signal; and processing the current sense signal, the first derivative signal and the second derivative signal to detect a stepper motor stall condition.

18. The circuit of claim 16, wherein the current sensing circuit comprises a sense resistor coupled between ground and a second terminal of one of the first and second windings of the stepper motor.

19. A circuit, comprising:

a current sensing circuit configured to sense current flowing through a winding of a stepper motor and output a current sense signal; and a stall sensing circuit configured to receive the current sense signal and determine whether the stepper motor has stalled by:

taking a derivative of the current sense signal to generate a derivative signal; and processing the current sense signal and the derivative signal to detect a stepper motor stall condition.

20. The circuit of claim 19, wherein the derivative is a first derivative.

21. The circuit of claim 20, wherein the determination of whether the stepper motor has stalled further comprises taking a Fast Fourier Transform (FFT) of a first derivative signal and the processing is processing of the FFT to detect high frequency fluctuations of the current sense signal to detect a stepper motor stall condition.

22. The circuit of claim 20, wherein the processing is processing a first derivative signal to detect a difference between minimum and maximum values of the first derivative signal within a window to detect a stepper motor stall condition.

23. The circuit of claim 20, wherein processing is processing a first derivative signal to detect zero crossings that do not correspond in frequency to a drive signal for driving the winding of the stepper motor to detect a stepper motor stall condition.

24. The circuit of claim 20, wherein processing is processing a first derivative signal to detect multiple zero crossings within a window to detect a stepper motor stall condition.

25. The circuit of claim 20, wherein processing is processing a first derivative signal to detect instances of the first derivative signal crossing over a long term average of the first derivative signal to detect a stepper motor stall condition.

26. The circuit of claim 19, wherein the derivative is both a first derivative and a second derivative and the processing is processing the current sense signal, a first derivative signal and a second derivative signal to detect a stepper motor stall condition.

27. The circuit of claim 19, wherein the current sensing circuit comprises a sense resistor coupled between ground and the winding of the stepper motor.

28. The circuit of claim 19, wherein the derivative is a second derivative.

29. The circuit of claim 28, wherein the processing is processing a second derivative signal to detect minimum and maximum values in excess of an absolute threshold to detect a stepper motor stall condition.

30. The circuit of claim 19, further comprising:
a differential amplifier circuit having a first input, a second input and an output, said output of the differential amplifier circuit configured to be coupled to a first terminal of said winding of the stepper motor; and
a digital to analog converter circuit configured to generate an input drive signal coupled to the first input of the differential amplifier circuit.

31. The circuit of claim 30, wherein the input drive signal has one of a sinusoidal shape or square wave shape.

32. The circuit of claim 30, wherein a second terminal of said winding of the stepper motor is coupled to ground through a resistor.

33. The circuit of claim 30, wherein the differential amplifier circuit includes a circuit configured to generate a reference voltage for application to the second input.

34. The circuit of claim 33, wherein the differential amplifier circuit further includes a feedback resistor coupled to form a feedback path from the output to the first input.

35. The circuit of claim 34, wherein the differential amplifier circuit has a first power supply input coupled to receive a positive supply voltage and a second power supply input coupled to receive a negative supply voltage.

36. A circuit, comprising:
a drive circuit configured to apply a drive signal to a winding of a stepper motor;
a current sensing circuit configured to sense current flowing through said winding of the stepper motor and output a current sense signal; and
a stall sensing circuit configured to receive the current sense signal and determine whether the stepper motor has stalled by processing the current sense signal to detect a stepper motor stall condition if oscillations in magnitude of the current sense signal having a frequency greater than a frequency of the drive signal.

37. The circuit of claim 36, wherein processing the current sense signal comprises comparing a magnitude of the current sense signal to a signal average to detect cross-overs within a time period that is shorter than a period of the drive signal.

38. The circuit of claim 36, wherein the current sensing circuit comprises a sense resistor coupled between ground and the winding of the stepper motor.

39. A circuit, comprising:
a drive circuit configured to apply a drive signal to a winding of a stepper motor;
a current sensing circuit configured to sense current flowing through said winding of the stepper motor and output a current sense signal; and
a stall sensing circuit configured to receive the current sense signal and determine whether the stepper motor has stalled by:
taking a derivative of the current sense signal to generate a derivative signal; and
processing the derivative signal to detect a stepper motor stall condition if oscillations in magnitude of the derivative signal have a frequency greater than a frequency of the drive signal.

40. The circuit of claim 39, wherein processing the derivative signal comprises comparing a magnitude of the derivative signal to a signal average to detect cross-overs within a time period that is shorter than a period of the drive signal.

41. The circuit of claim 39, wherein the derivative is a first derivative.

42. The circuit of claim 39, wherein the current sensing circuit comprises a sense resistor coupled between ground and the winding of the stepper motor.

43. A circuit, comprising:
a drive circuit configured to apply a drive signal to a winding of a stepper motor;
a current sensing circuit configured to sense current flowing through said winding of the stepper motor and output a current sense signal; and
a stall sensing circuit configured to receive the current sense signal and determine whether the stepper motor has stalled by:
taking a second derivative of the current sense signal to generate a second derivative signal; and
processing the second derivative signal to detect a stepper motor stall condition if maximum or minimum values of the second derivative signal exceed an absolute threshold.

44. The circuit of claim 43, wherein the current sensing circuit comprises a sense resistor coupled between ground and the winding of the stepper motor.

45. A circuit, comprising:
a drive circuit configured to apply a drive signal to a winding of a stepper motor;
a current sensing circuit configured to sense current flowing through said winding of the stepper motor and output a current sense signal; and
a stall sensing circuit configured to receive the current sense signal and determine whether the stepper motor has stalled by:
taking a derivative of the current sense signal to generate a derivative signal; and
processing the derivative signal to detect a stepper motor stall condition if a difference between maximum and minimum values of the derivative signal over a time period exceeds a difference threshold.

46. The circuit of claim 45, wherein the time period is less than a period of the drive signal.

47. The circuit of claim 45, wherein the derivative is a first derivative.

48. The circuit of claim 45, wherein the current sensing circuit comprises a sense resistor coupled between ground and the winding of the stepper motor.

49. A circuit, comprising:
- a drive circuit configured to apply a drive signal to a winding of a stepper motor;
- a current sensing circuit configured to sense current flowing through said winding of the stepper motor and output a current sense signal; and
- a stall sensing circuit configured to receive the current sense signal and determine whether the stepper motor has stalled by:
  - taking a derivative of the current sense signal to generate a derivative signal;
  - producing a Fast Fourier Transform of the derivative signal; and
  - processing the Fast Fourier Transform to detect a stepper motor stall condition if a frequency increases at a frequency higher than a frequency of the drive signal.

50. The circuit of claim 49, wherein the derivative is a first derivative.

51. The circuit of claim 49, wherein the current sensing circuit comprises a sense resistor coupled between ground and the winding of the stepper motor.

52. A circuit, comprising:
- a drive circuit configured to apply a drive signal to a winding of a stepper motor;
- a current sensing circuit configured to sense current flowing through said winding of the stepper motor and output a current sense signal; and
- a stall sensing circuit configured to receive the current sense signal and determine whether the stepper motor has stalled by:
  - taking a derivative of the current sense signal to generate a derivative signal; and
  - processing the derivative signal to detect a stepper motor stall condition if multiple zero-crossings of the derivative signal occur within a time period shorter than a time period of the drive signal.

53. The circuit of claim 52, wherein the derivative is a first derivative.

54. The circuit of claim 52, wherein the current sensing circuit comprises a sense resistor coupled between ground and the winding of the stepper motor.

55. A circuit, comprising:
- a drive circuit configured to apply a drive signal to a winding of a stepper motor;
- a current sensing circuit configured to sense current flowing through said winding of the stepper motor and output a current sense signal; and
- a stall sensing circuit configured to receive the current sense signal and determine whether the stepper motor has stalled by:
  - taking a derivative of the current sense signal to generate a derivative signal; and
  - processing the derivative signal to detect a stepper motor stall condition if multiple crossings of the derivative signal over an average of the derivative signal occur within a time period shorter than a time period of the drive signal.

56. The circuit of claim 55, wherein the derivative is a first derivative.

57. The circuit of claim 55, wherein the current sensing circuit comprises a sense resistor coupled between ground and the winding of the stepper motor.

* * * * *